(12) United States Patent
Akama

(10) Patent No.: US 8,068,822 B2
(45) Date of Patent: Nov. 29, 2011

(54) INFORMATION EXCHANGE METHOD BETWEEN MOBILE TERMINAL DEVICES

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 12/626,191

(22) Filed: Nov. 25, 2009

(65) Prior Publication Data

US 2010/0069050 A1    Mar. 18, 2010

Related U.S. Application Data

(63) Continuation of application No. PCT/JP2007/000782, filed on Jul. 23, 2007.

(51) Int. Cl.
*H04M 3/42* (2006.01)
*H04L 29/06* (2006.01)
*H04W 4/00* (2009.01)

(52) U.S. Cl. .................. 455/414.1; 455/414.3; 455/466

(58) Field of Classification Search .... 455/414.1–414.3, 455/412.1–412.2, 466, 517–519, 418–420, 455/41.2–41.3

See application file for complete search history.

(56) References Cited

U.S. PATENT DOCUMENTS

| 7,184,785 | B2* | 2/2007 | Balley et al. | 455/466 |
| 7,761,121 | B2* | 7/2010 | Byeon et al. | 455/566 |
| 7,849,135 | B2* | 12/2010 | Agrawal et al. | 709/204 |

FOREIGN PATENT DOCUMENTS

| JP | 7-283873 | 10/1995 |
| JP | 8-223279 | 8/1996 |
| JP | 2002-320259 | 10/2002 |
| JP | 2003-179609 | 6/2003 |
| JP | 2004-349991 | 12/2004 |

OTHER PUBLICATIONS

International Search Report for PCT/JP2007/000782, mailed Nov. 6, 2007.

* cited by examiner

*Primary Examiner* — Brandon Miller
(74) *Attorney, Agent, or Firm* — Staas & Halsey LLP

(57) ABSTRACT

An information exchange system includes a first mobile terminal device having publication notification request unit to request a publication notification, and information notification unit to transmit, upon receiving a publication request, the particular information to a mobile terminal device that sent the request; a second mobile terminal device having publication notification unit to send a publication notification to a mobile terminal device registered in a registration information storing unit; and a third mobile terminal device having information obtaining unit to send a publication request for the particular information to the first mobile terminal device to obtain the specific information from the first mobile terminal device.

7 Claims, 6 Drawing Sheets

INFORMATION EXCHANGE METHOD BETWEEN MOBILE TERMINAL DEVICES

CROSS-REFERENCE TO RELATED APPLICATION

This application is a continuation of PCT application of PCT/JP2007/000782, which was filed on Jul. 23, 2007.

FIELD

The present invention relates to an information exchange method of exchanging an arbitrary information between particular mobile terminal devices.

BACKGROUND

In recent years, mobile terminal devices such as mobile phones have been equipped with various functions. Among such functions is a voice recording function with which voice information may be recorded, and may be played back and deleted as needed. However, since the memory capacity of a mobile terminal device is limited, there have been problems such as, when recording is performed while some important data have been recorded, the already-recorded important data were deleted.

In order to solve the problem, Patent document 1 discloses a mobile communication system in which a conversation being carried on with a mobile terminal device is recorded in a voice storage device disposed in a switching system so that the recorded content may be played back later to review the conversation content with the other party.

In addition, in relation to the above technique, Patent document 2 discloses a mobile phone that detects the memory usage rate, and performs message transfer of recoded digital signals to another phone having a recording function when the memory usage rate exceeds a predetermined level, in order to enable recording, playback etc. of a plurality of matters without increasing the memory capacity to be installed in the main body.

Patent document 1: Japanese Laid-open Patent Application No. 07-283873
Patent document 2: Japanese Laid-open Patent Application No. 08-223279

SUMMARY

According to an aspect of the embodiments, an information exchange system exchanging information between specific mobile terminal devices, including: a first mobile terminal device having information storing unit to store an arbitrary information, publication notification request unit to request a publication notification that particular information stored in the information storing unit is to be published to the specific mobile terminal devices, and information notification unit to transmit, upon receiving a publication request for the particular information, the particular information to a mobile terminal device that sent the request; a second mobile terminal device having registration information storing unit to register the specific mobile terminal devices, and publication notification unit to send a publication notification to a mobile terminal device registered in the registration information storing unit; and a third mobile terminal device having information obtaining unit to send a publication request for the particular information to the first mobile terminal device to obtain the specific information from the first mobile terminal device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

As described previously, the recording of a large amount of voice information became available, generating a demand for information exchange between a plurality of users about the voice information.

Hereinafter, an embodiment of the present invention will be explained on the basis of FIG. 1-FIG. 6.

Figure 1:
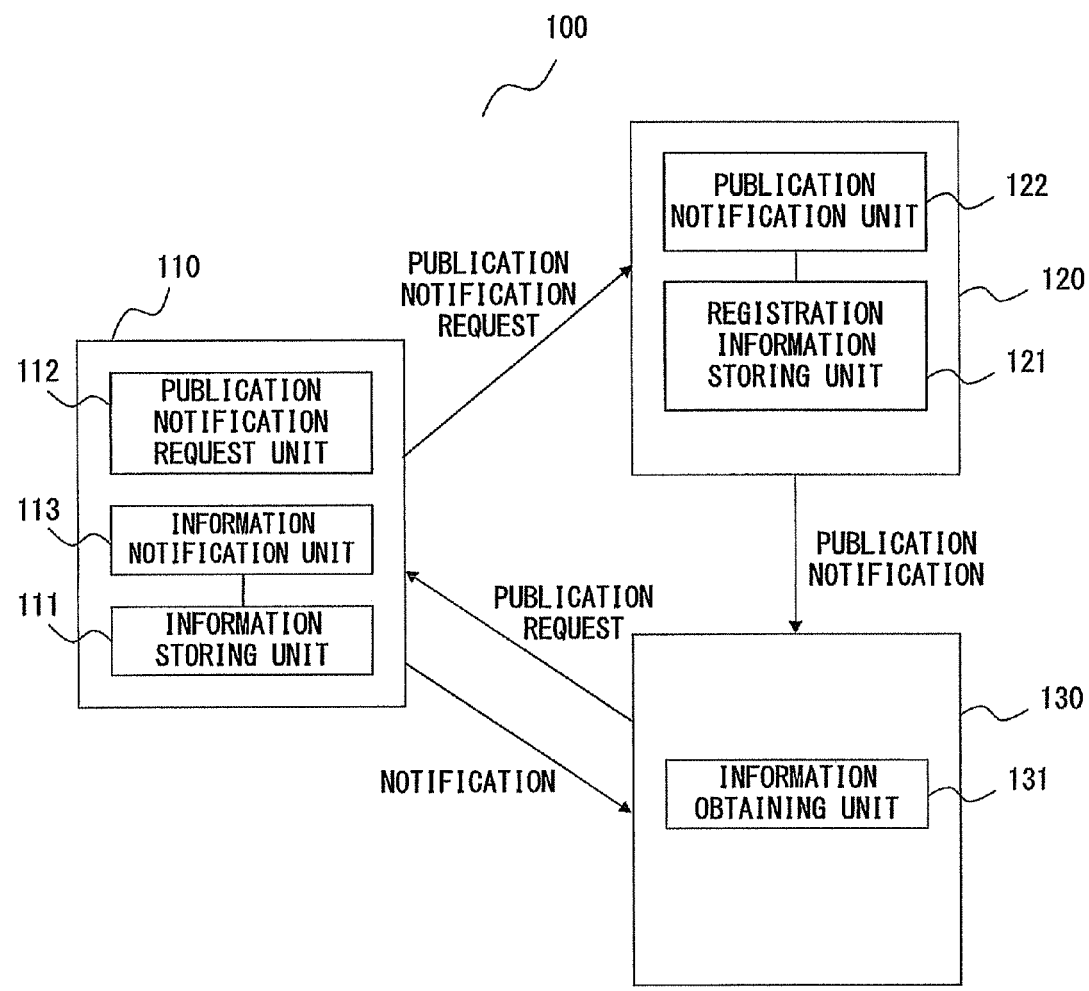
FIG. 1 is a diagram illustrating outline of an information exchange system according to an embodiment of the present invention.

FIG. 1 is a diagram illustrating outline of an information exchange system according to an embodiment of the present invention.

An information exchange system 100 illustrated in FIG. 1 includes a mobile terminal device (hereinafter, referred to as a "specific mobile terminal device A") 110 publishing particular information to another mobile terminal device, a mobile terminal device (hereinafter, referred to as a "representative mobile terminal device") 120 giving a notification, to a specific mobile terminal device, that the specific mobile terminal device A110 is publishing information, and a mobile terminal device (hereinafter, referred to as a "specific mobile terminal device B") 130 obtaining information from the particular mobile terminal device A110 in accordance with the notification.

The specific mobile terminal device A110 includes an information storing unit 111 storing an arbitrary information, a publication notification request unit 112 requesting the transmission, to a particular mobile terminal device, of a notification (hereinafter, referred to as a "publication notification") that particular information (hereinafter, referred to as "public information") stored in the information storing unit 111 is to be published, and an information notification unit 113 sending a notification of public information in accordance with a publication request from a mobile terminal device.

The representative mobile terminal device 120 includes a registration information storing unit 121 registering a particular mobile terminal device, and a publication notification unit 122 sending a publication notification to a particular mobile terminal device, that is, a mobile terminal device registered in the registration information storing unit 121.

The particular mobile terminal device B130 includes an information obtaining unit 131 sending a request (referred to as a "publication request") for public information to the specific mobile terminal device A110 in accordance with the publication notification and obtaining the publish information.

The information storing unit 111 stores information (voice information, music information, image information, video information, mails, etc.) obtained through various functions (for example, the voice recording function, camera function, mail function, memo function, external input function from a memory card and the like) provided in the specific mobile terminal device A110. Accordingly, public information is also voice information, music information, image information, video information, mails, etc.

In accordance with an instruction from a user and the like issued through a predetermined operation, the publication notification request unit requests the representative mobile terminal device 120 to send, to a particular mobile terminal, a publication notification notifying that public information stored in the information storing unit 111 is to be published (hereinafter, the request is referred to as a "publication notification request").

In accordance with a publication request from a mobile terminal device that received a publication notification, the information notification unit 113 sends a notification of the public information to the mobile terminal.

The registration information storing unit 121 registers a particular mobile terminal device. In this embodiment, the phone number of a mobile terminal device (specific mobile terminal devices A110, B130) is registered. However, without being limited to the phone number, it may be other information (for example, the mail address and the like) with which the mobile terminal device may be identified and communication between mobile terminal devices may be performed.

Upon receiving a publication notification request from the specific mobile terminal device A110, the publication notification unit 122 refers to the registration information storing unit 121, and sends a publication notification to a mobile terminal device (for example, the specific mobile terminal device A110, B130) that is registered in the registration information storing unit 121.

Upon receiving a publication notification from the representative mobile terminal device 120, the information obtaining unit 131 sends a publication request to the specific mobile terminal device A110 and obtains the public information.

The information exchange system described above, the specific mobile terminal devices A110, B130 and the representative mobile terminal device are equipped with different unit in order to facilitate the understanding of the roles of mobile terminal devices constituting the system, but the specific mobile terminal devices A110, B130 and the representative mobile terminal device may be equipped with the same unit.

For example, each of the specific mobile terminal devices A110, B130 and the representative mobile terminal device may be equipped with the information storing unit 111, publication notification request unit 112, information notification unit 113, registration information storing unit 121, publication notification unit 112, and information obtaining unit 131.

A specific configuration example of the information exchange system described above is explained below. Meanwhile, while a case of using voice information (hereinafter, referred to as "voice data") as public information is to be explained to make the explanation simple, it is not to limit the public information to voice information. Music information, image information, video information, mails, etc. may also be used as the public information.

Figure 2:
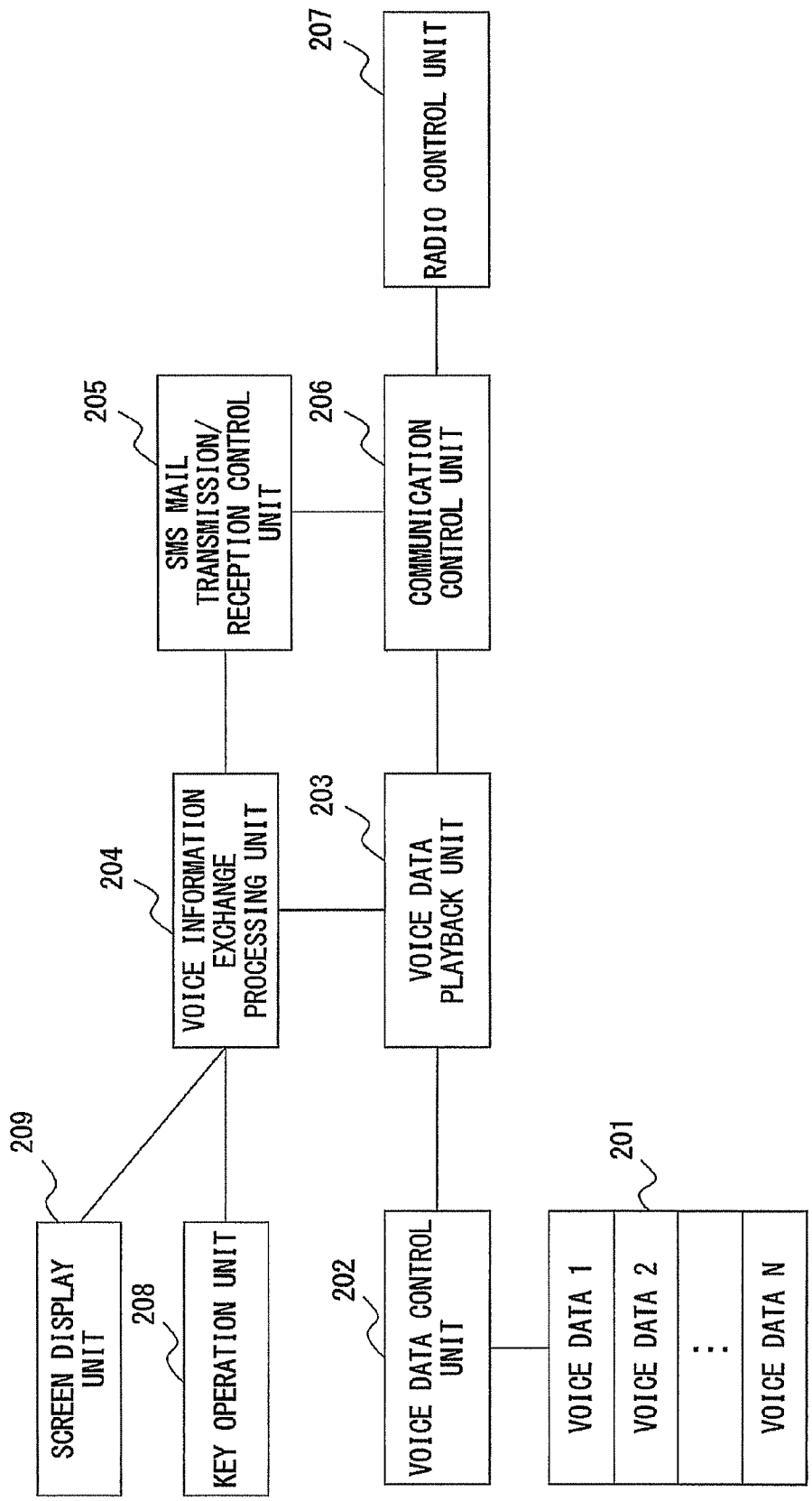
FIG. 2 is a block diagram illustrating a specific configuration example of a specific mobile terminal device according to the embodiment of the present invention.

FIG. 2 is a block diagram illustrating a specific configuration example of the specific mobile terminal device A110 according to the embodiment of the present invention.

The particular mobile terminal device A110 illustrated in FIG. 2 includes a voice data storing unit 201 storing a plurality of pieces of voice data (for example, voice data 1, 2, . . . , N), a voice data control unit 202 performing the storing, reading out and the like of voice data in accordance with an instruction, a voice data playback unit 203 playing pack voice data, a voice information exchange processing unit 204 performing the publication of voice data, and the like in accordance with a request, an SMS (short message service) mail transmission/reception control unit 205 controlling the transmission and reception of an SMS mail used for message communication with another mobile terminal device, a communication control unit 206 performing communication control, a radio control unit 207 performing radio communication in accordance with the radio standard being used, a key operation unit 208 used for operating the specific mobile terminal device A110, and a screen display unit 209 performing an arbitrary display.

The voice data storing unit 201 uses the recording function that is not illustrated in the drawing provided in the particular mobile terminal device A110, to store voice data obtained through an external storage device (for example, a mini SD card and micro SD card), or, obtained using a communication function (for example, a mail function, infrared-light communication, Bluetooth).

When a user orders a publication notification request by performing a predetermined key operation, the voice information exchange processing unit 204 performs message communication with the representative mobile terminal device 120 through the SMS mail transmission/reception control unit 205, the communication control unit 206 and the radio control unit 207. Then, the voice information exchange processing unit 204 sends a publication notification request to the representative mobile terminal device 120.

Meanwhile, upon receiving a publication request for voice data from the specific mobile terminal device B130 through the SMS mail transmission/reception control unit 205, the communication control unit 206 and the radio control unit 207, the voice information exchange processing unit 204 perform voice talk connection with the specific mobile terminal device B130, and instructs the voice data playback unit 203 to playback public information.

The voice data playback unit 203 plays back public information stored in the voice data storing unit 201 through the voice data control unit 202, and transmits the played-back voice to the specific mobile terminal device B130 through the communication control unit 206 and the radio control unit 207.

The configuration of the specific mobile terminal device B130 may be, the same configuration as that of the specific mobile terminal device A110 illustrated in FIG. 2, or may be the configuration in which the voice data storing unit 201, the voice data storing unit 202 and the voice data playback unit 203 are removed from the specific mobile terminal device A110 illustrated in FIG. 2.

In this case, the voice information exchange processing unit 204 sends, in accordance with an instruction from a user, a publication request to the specific mobile terminal device A110 through the SMS mail transmission/reception control unit 305, communication control unit 306 and the radio control unit 307.

Further, the voice information exchange processing unit 204 performs voice talk connection with the specific mobile terminal device A110 through the communication control unit 206 and the radio control unit 207. Then, the voice information exchange processing unit 204 obtains public information from the particular mobile terminal device A110.

Figure 3:
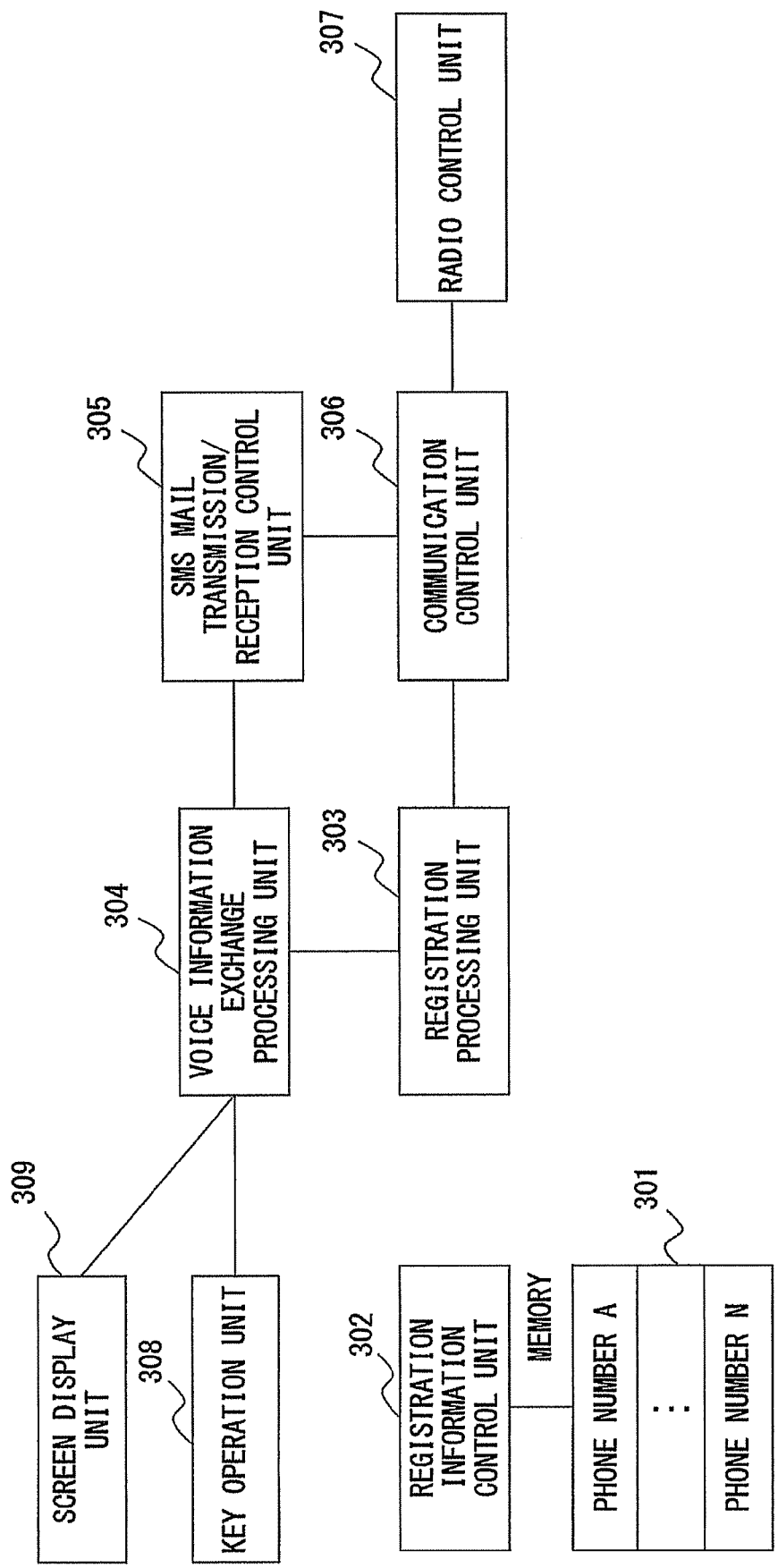
FIG. 3 is a specific configuration example of a representative mobile terminal device according to the embodiment of the present invention.

FIG. 3 is a block diagram illustrating a specific configuration example of the representative mobile terminal device 120 according to the embodiment of the present invention.

The representative mobile terminal device 120 illustrated in FIG. 3 includes a registration information storing unit 301 registering (storing) the phone number of a particular mobile terminal device, a registration information control unit 302 performing the registration, reading out, and the like of a phone number in accordance with an instruction, a registration processing unit 303 ordering the registration information control unit 302 to register a an arbitrary phone number, a voice information exchange processing unit 304 performing a publication notification, an SMS mail transmission/reception control unit 305 controlling the transmission and reception of an SMS mail used for message communication with another mobile terminal device, a communication control unit 306 performing communication control, a radio control unit 307 performing radio communication in accordance with the radio standard being used, a key operation unit 308 used for operating the representative mobile terminal device 120, and a screen display unit 309 performing an arbitrary display.

Particular mobile terminal devices are registered in the registration information storing unit 301. Here, the particular mobile terminal devices refer to a plurality of mobile terminal devices that are to share voice data held in the respective mobile terminal devices. In this embodiment, the phone numbers (SMS mail transmission destination numbers) of the respective mobile terminal devices are registered in the registration information storing unit 301.

When a user inputs the phone number of a mobile terminal device to be registered by performing a predetermined key operation, the registration processing unit 303 makes, through the registration information control unit 302, the registration information storing unit 301 store the phone number.

Upon receiving a publication notification request through the SMS mail transmission/reception control unit 305, the communication control unit 306 and the radio control unit 307, the voice information exchange processing unit 304 refers to the registration information storing unit 301. Then, message communication is started with registered particular mobile terminal devices B130 at the same time (or sequentially) through the SMS mail transmission/reception control unit 305, the communication control unit 306 and the radio control unit 307, and the publication notification is performed.

Figure 4:
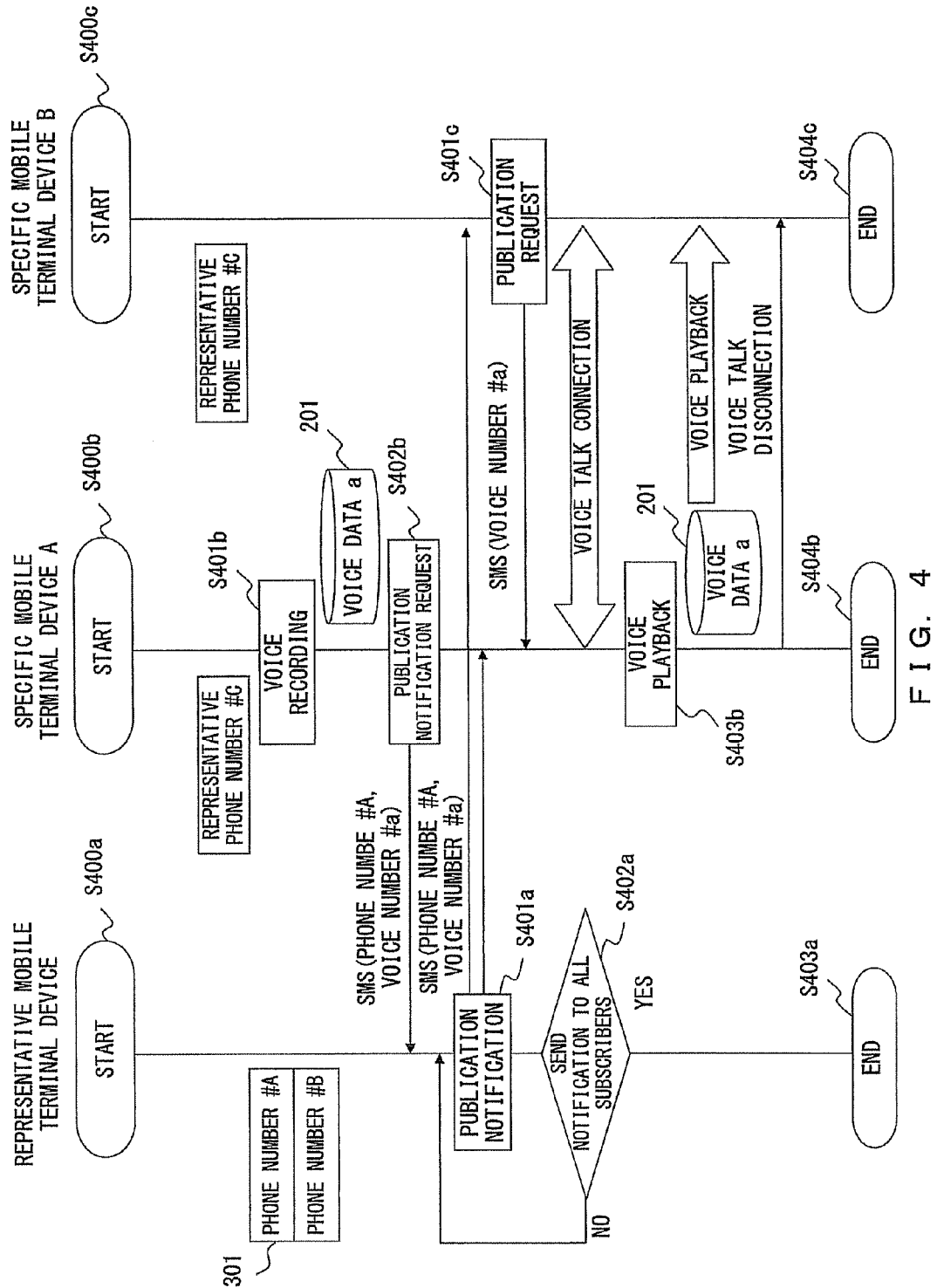
FIG. 4 is a flowchart illustrating specific processes in the information exchange system according to the embodiment of the present invention.

FIG. 4 is a flowchart illustrating specific processes in the information exchange system 100 according to the embodiment of the present invention.

Meanwhile, in order to simplify the explanation, the explanation is made about a case in which the specific mobile terminal device A110 (the phone number of the device is assumed as a "phone number #A") and the specific mobile terminal device B130 (the phone number of the device is assumed as a "phone number #B") are registered in the registration information storing unit 301, and the specific mobile terminal device A110 publishes voice data a. In addition, it is assumed that, in the respective specific mobile terminal devices A110 and B130, a phone number #C of the representative mobile terminal device 120 is registered in advance in a storage device that is not illustrated in the drawing.

When a user performs a predetermined operation in step S401b, the specific mobile terminal device A110 generates and stores, in the voice data storage unit 201, voice data a (the identification number of the data is assumed as a "voice number #a") from a voice. When the voice recording is completed, the specific mobile terminal device A110 moves the process to step S402b.

In step S402b, the specific mobile terminal device A110 reads out, from the storage device, the phone number #C of the representative mobile terminal device 120 (hereinafter, referred to as the "representative phone number #C" that includes been registered in advance, and starts message communication with the representative mobile terminal device 120 in accordance with the representative phone number #C.

Then, the specific mobile terminal device A110 sends a publication notification request for the voice data having the voice number #a to the representative mobile terminal device 120. At this time, the specific mobile terminal device A110 sends, to the representative mobile terminal device 120, the notification of its own phone number (phone number #A) and the voice number #a of the voice data to be published.

Meanwhile, in step S401a, upon receiving a publication notification request from the specific mobile terminal device A110, the representative mobile terminal device 120 refers to the registration information storing unit 301, and sends a publication notification to all registered particular mobile terminal devices (in FIG. 4, the particular mobile terminal devices A110 and B130). At this time, the representative mobile terminal device 120 sends the notification of the phone number #A of the specific mobile terminal device A110 that sent the publication notification request and the voice number #a of the voice data to be published, to the respective specific mobile terminal devices.

In step S402b, the representative mobile terminal device 120 determines whether or not the publication notification has been sent to all the specific mobile terminal devices registered in the registration information storing unit 301. Then, when there is any specific mobile terminal device to which the publication notification has not been sent, the process is moved to step S401a. Meanwhile, when there is no particular mobile terminal device to which the publication notification has not been sent, the representative mobile terminal device 120 moves to step S403a and terminates the process.

Meanwhile, in step S401c, when the user who received the publication notification from the representative mobile terminal device 120 wants to listen to the voice data, the user instructs, by a predetermined operation, the specific mobile terminal device B130 to perform publication request. Then, the specific mobile terminal device B130 starts message communication with a mobile terminal device A in accordance with the phone number #A in the notification. Then, The publication request for the voice data having the voice number #a is performed.

In step S403b, upon receiving a publication request from the specific mobile terminal device B130, the specific mobile terminal device A110 terminates the message notification with specific mobile terminal device B130, and performs voice talk connection with the specific mobile terminal device B130. Then, the voice data having the voice number #a that have been requested is read out from the voice data storing unit 201 and played back, and transmitted to the specific mobile terminal device B130.

When the playback of the voice data is completed, the specific mobile terminal device A110 and the specific mobile terminal device B130 terminate the voice talk connection and move to step S404b, S402c, respectively, and complete the process.

Figure 5:
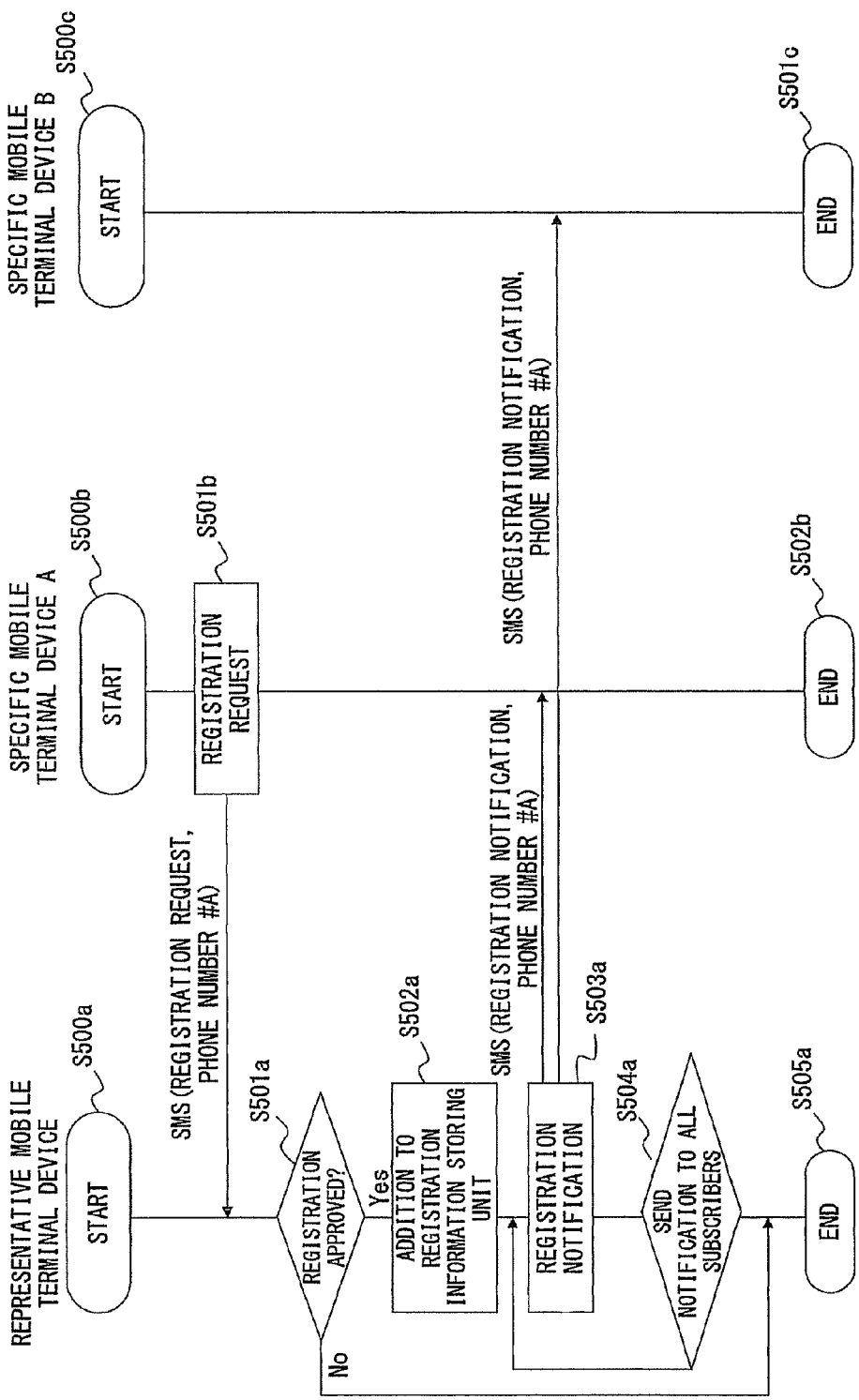
FIG. 5 is a flowchart illustrating a registration process to a registration information storing unit according to the embodiment of the present invention.

FIG. 5 is a flowchart illustrating the registration process to the registration information storing unit 301 according to the embodiment of the present invention. A case of registering the specific mobile terminal device A110 in the registration information storing unit 301 is explained.

In step S501b, when a user orders the registration to the registration information storing unit 301 by performing a certain process, the specific mobile terminal device A110 obtains the representative phone number that has been registered in advance from the storage device, and performs message communication with the representative mobile terminal device 120. Then, a notification of a registration request is sent to the representative mobile terminal device 120. At this time, a notification of the phone number #A of its own is also sent.

In step S501a, upon receiving a registration request from the specific mobile terminal device A110, the representative mobile terminal device 120 determines whether or not the registration may be performed. At this time, for example, the display of the fact that the registration request has been issued and a request for the user to determine whether or not the registration may be performed may be displayed on the screen display unit 309 and whether or not the registration may be performed may be processed in accordance with the instruction issued from the user as to whether or not the registration may be performed, or a list of mobile terminal devices for which the registration is allowed may be stored in the storing device in advance, and whether or not the registration may be performed may be determined by the comparison with the list.

When the registration is not approved in step S501a, the representative mobile terminal device 120 moves to step S505a and terminated the process. Meanwhile, when the registration is approved, the representative mobile terminal device 120 moves to step S502a. Then, the phone number #A of the specific mobile terminal device A110 is registered in the registration information storing unit 301.

In step S503a, upon the completion of the registration, the representative mobile terminal device 120 refers to the registration information storing unit 301, and sends a notification that the specific mobile terminal device A110 has newly been registered in the registration information storing unit 301 (hereinafter, referred to as a "registration notification") to all mobile terminal devices registered in the registration information storing unit 301. At this time, as illustrated in FIG. 5, a notification of the phone number #A of the particular mobile terminal device A110 that has newly been registered may be sent.

In step S504a, the representative mobile terminal device 120 determines whether or not the registration notification has been sent to all the mobile terminal devices registered in the registration information storing unit 301. Then, if there is any mobile terminal device to which the registration notification has not been sent, move to step S503a is performed, and if the registration notification has been sent to all the mobile terminal devices, move to step S505a is performed and the process is completed.

Figure 6:
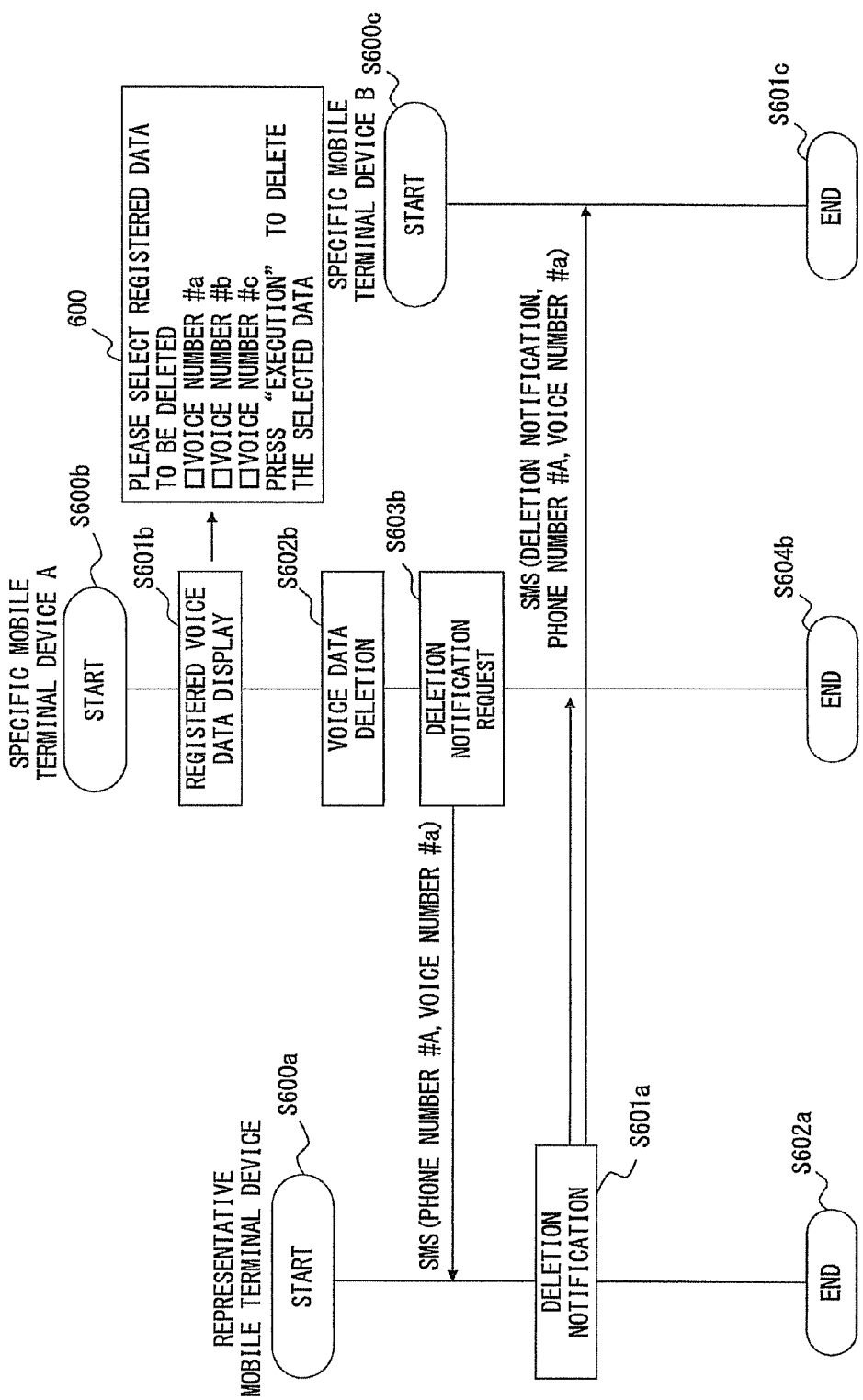
FIG. 6 is a flowchart illustrating a deletion process of voice data according to the embodiment of the present invention.

FIG. 6 is a flowchart illustrating the deletion process of voice data according to the embodiment of the present invention.

In step S601b, when a user orders the deletion of voice data by performing a predetermined operation, the specific mobile terminal device A110 refers to the voice data storing unit 201 provided in the specific mobile terminal device A110, and obtains the voice numbers of voice data stored in the voice data storing unit 201. Then, the voice numbers are displayed on the screen display unit 209, and the user is asked to select the voice data to be deleted.

A display screen 600 illustrated in FIG. 6 is a display example on the screen display unit 309 in a case in which voice data a (voice number #a), voice data b (voice number #b), and voice data c (voice number #c) are stored in the voice data storing unit 201.

In step S602b, when the user selects the voice data to be deleted, the specific mobile terminal device A110 obtains the voice number through the key operation unit 208. Meanwhile, with the example in FIG. 6, a case in which the user selects voice data a (voice number #a) is explained.

Upon obtaining the voice number, the specific mobile terminal device A110 deletes the voice data having the voice number #a from the voice data storing unit 201.

In step S603b, the specific mobile terminal device A110 requests the representative mobile terminal device 120 to send a notification that the voice data a for which a public notification had already been sent was deleted (hereinafter, referred to a "deletion notification"). Hereinafter, the request is referred to as a "deletion notification request". At this time, the specific mobile terminal device A110 performs message communication with the representative mobile terminal device 120. Then, the specific mobile terminal device A110 sends, along with the deletion notification request, the phone number #A as the information to identify itself and the voice number #a of the deleted voice data to the representative mobile terminal device 120. Then, the process is terminated (step S604b).

Meanwhile, in step S601a, upon receiving a deletion notification request from the specific mobile terminal device A110, the representative mobile terminal device 120 refers to the registration information storing unit 301. Then, a deletion notification is sent to specific mobile terminal devices (in the example of FIG. 6, the particular mobile terminal devices A110 and B130) registered in the registration information storing unit 301. At this time, the representative mobile terminal device 120 performs message communication with the respective particular mobile terminal devices. Then, the representative mobile terminal device 120 sends, in accordance with the deletion notification, the phone number #A of the particular mobile terminal device that sent the deletion notification request and the voice number #a of the deleted voice data to the respective particular mobile terminal devices. Then, the process is terminated (step S602a).

As explained above, in the information exchange system 100 according to the present embodiment, when information (public information) held in the specific mobile terminal device A110 is published, a publication notification request is send from the specific mobile terminal device A110 to the representative mobile terminal device 120, and in accordance with the publication notification request, a publication notification is sent to the respective particular mobile terminal devices from the representative mobile terminal device 120. When the specific mobile terminal device B130 that received the publication notification sends a publication request to the specific mobile terminal device A110, the exchange of information is performed between the particular mobile terminal device A110 and the particular mobile terminal device B130.

Therefore, there is an effect that the information exchange of information such as voice data, music data, image data, video data, mails held in any particular mobile terminal device becomes possible between particular mobile terminal devices.

In addition, in the information exchange system 100 according to the embodiment, since information such as voice data held in the respective mobile terminal devices are published and shared between particular mobile terminal devices, the shared information is distributed and held (stored) in the respective mobile terminal devices. As a result, a large amount of information may be held in particular mobile terminal devices as a whole, without increasing the memory capacity of the storage device provided in a single mobile terminal device.

In addition, in the information exchange system 100 according to the present embodiment, published voice data are stored in the storage device provided in the specific mobile terminal device A110, and may be deleted easily by operating the specific mobile terminal device A110.

In addition, since there is no need to use any conversation recording service by unit of a voice data store-and-forward switching system that holds recorded voice data for a certain period in a conventional manner, the connection to a store-and-forward switching system is no longer needed. As a result, costs regarding the communication such as communication charges and communication times may be eliminated.

According to the embodiments, when particular information held in the first mobile terminal device is to be published, a publication notification request is sent from the first mobile terminal device to the second mobile terminal device, and a publication notification is sent from the second mobile terminal device to the respective mobile terminal devices. When the third mobile terminal device that received the publication notification sends a publication request to the first mobile terminal device, the exchange of information is performed between the first mobile terminal device and the third mobile terminal device.

As described above, according to the embodiments, it becomes possible to provide an information exchange method with which information exchange may be performed between particular mobile terminal devices about information such as voice information stored in an arbitrary mobile terminal device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has (have) been described in detail, it may be understood that the various changes, substitutions, and alterations could be made hereto without departing from the spirit and scope of the invention.

What is claimed is:

1. An information exchange system exchanging information between specific mobile terminal devices, comprising: a first mobile terminal device having information storing unit to store an arbitrary information, publication notification request unit to request a publication notification that particular information stored in the information storing unit is to be published to the specific mobile terminal devices, and information notification unit to transmit, upon receiving a publication request for the particular information, the particular information to a mobile terminal device that sent the request; a second mobile terminal device having registration information storing unit to register the specific mobile terminal devices, and publication notification unit to send a publication notification to a mobile terminal device registered in the registration information storing unit; and a third mobile terminal device having information obtaining unit to send a publication request for the particular information to the first mobile terminal device to obtain the particular information from the first mobile terminal device.

2. The information exchange system according to claim 1, wherein the information is voice information.

3. The information exchange system according to claim 1, where in the information is image information, video information or music information.

4. The information exchange system according to claim 1, wherein the first mobile terminal device comprises information deletion unit to delete the particular information from the information storing unit.

5. The information exchange system according to claim 1, wherein the first mobile terminal device comprises publication rejection unit to reject, in response to a publication request from the third mobile terminal device, the publication request.

6. An information exchange method of exchanging information between specific mobile terminal devices, comprising: requesting, by a first mobile terminal device having information storing unit to store particular information, a publication notification that the particular information stored in the information storing unit is to be published to the specific mobile terminal devices; sending, by a second mobile terminal device having registration information storing unit to register the specific mobile terminal devices, upon receiving the request of the publication notification, a publication notification to a mobile terminal device registered in the registration information storing unit; and when a third mobile terminal device that received the publication notification sends a publication request for the particular information to the first mobile terminal device, transmitting, by the first mobile terminal device, the requested particular information to the third mobile terminal device.

7. A mobile terminal device to perform exchange of information between specific mobile terminal devices, comprising: information storing unit to store an arbitrary information; publication notification request unit to request a publication notification that particular information stored in the information storing unit is to be published to the specific mobile terminal devices; registration information storing unit to register the specific mobile terminal devices; publication notification unit to send, upon receiving the request for the publication notification, a publication notification to a mobile terminal device registered in the registration information unit; information obtaining unit to send, upon receiving the publication notification, a publication request for the particular information to a mobile terminal device to obtain the particular information; and information notification unit to transmit, upon receiving the publication request for the particular information, the particular information to a mobile terminal device that sent the request.

* * * * *